Nov. 27, 1934.  S. C. MILLER  1,981,873
METHOD FOR AGING AND COLORING WHISKY
Filed March 23, 1933
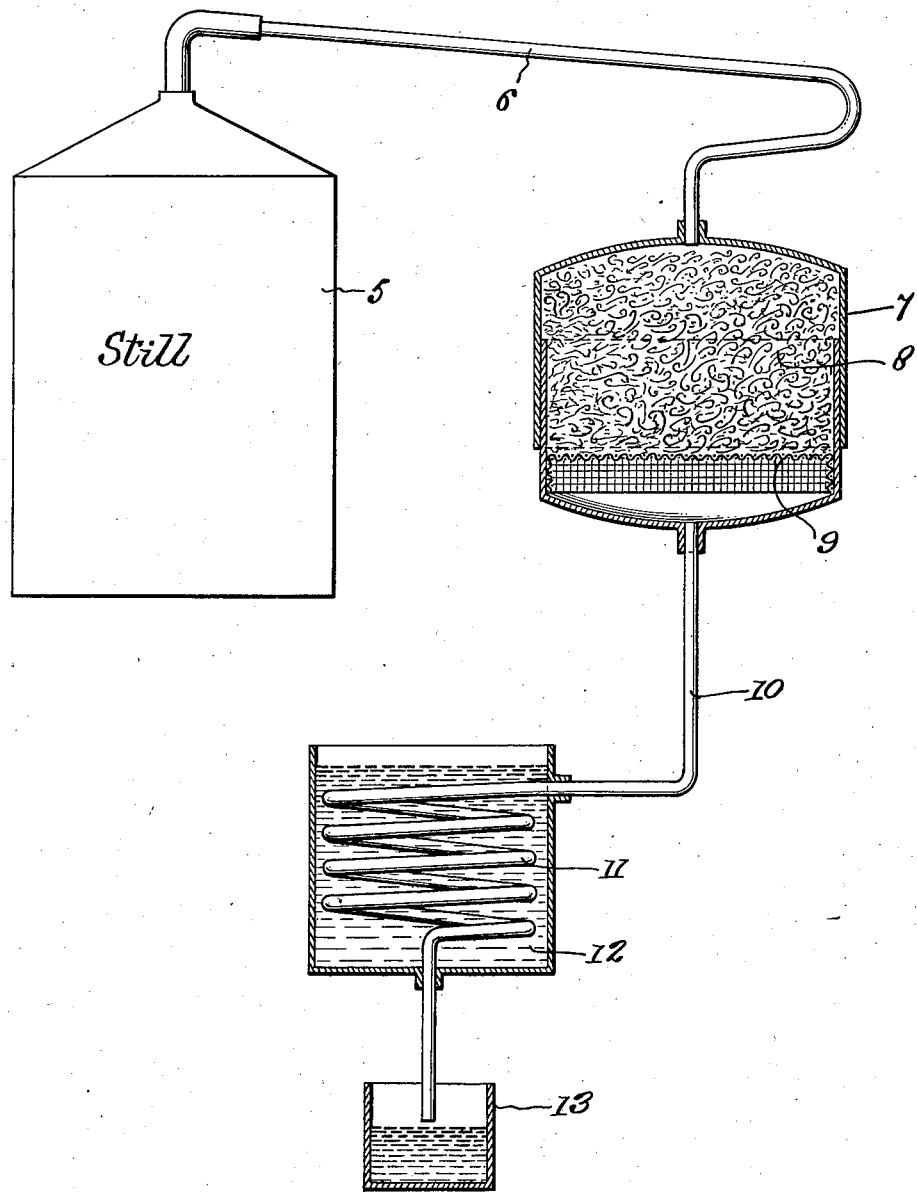
Inventor
Samuel C. Miller
By Wilkinson & Mawhinney
Attorneys.

Patented Nov. 27, 1934

1,981,873

UNITED STATES PATENT OFFICE 1,981,873

METHOD FOR AGING AND COLORING WHISKY

Samuel C. Miller, Louisville, Ky., assignor, by mesne assignments, to The Frankfort Distillery, Louisville, Ky., a corporation of West Virginia Application March 23, 1933, Serial No. 662,369

1 Claim. (Cl. 202—78)

The present invention relates to improvements in methods for aging and coloring whisky and has for an object to provide an improved method whereby whisky coming from the still is subjected to a reaction which promptly gives color to the whisky and ages the same, reducing the amount of fusel oil and otherwise making the product a consumable one.

The invention relates to certain steps of the process or method and to certain features of apparatus, all of which will be hereinafter more fully described and pointed out in the appended claim.

In the drawing,

The figure is a diagrammatic view showing an apparatus partly in elevation and partly in section for carrying out the herein described method.

It has been learned from research work in my laboratory that the flavor of whisky traces back to the essence or essential oils, consisting in the alcohol soluble resins, esters and similar substances, in the grain, which combine in the barrel with essential oils extracted from the wood. It has also been learned that when these two oils, that is the essential oils from the grain and those from the wood, are combined immediately, the required aging period is much reduced, as it takes the whisky two or three years to extract the essential oils from the wood in the barrel when lying in the ware-house.

By passing the vapors from the still through a tank filled with wood shavings, the hot vapors, in the neighborhood of 200° F., partly condense on the shavings which are at room temperature at the beginning of the distillation, and extract or leach out the essential oils from the wood along with the tannin or wood color, which gives the new whisky the characteristic color of old whisky.

The partly condensed whisky drips through a screen in the bottom of the tank holding the wood shavings, and finds its way through the condenser worm into the final receiving tank. The uncondensed vapors, of course, are condensed in the condenser worm, which latter is surrounded by water.

Referring more particularly to the drawing, 5 represents in a general way a still of any conventional form in which whisky is manufactured. The alcoholic vapors pass through the pipe 6 and into the upper portion of a container 7 in which a suitable quantity of body of wood shavings 8 have been placed. These wood shavings may be massed to any desired density but they will preferably be contained in such quantity as to allow the recently distilled alcoholic vapors coming over from the still 5 to become partially condensed throughout great portions of the wood shavings. The wood shavings are supported upon a screen 9 which extends across the tank 7 near the bottom thereof and permits the partly condensed whisky to drip through the meshes thereof on to the bottom of the tank 7. This bottom of the tank is connected by a pipe 10 with a condensing worm 11 immersed in a water cooling bath 12. The worm 11 discharges into a receiving cistern 13 where the condensed, aged and colored liquor is collected.

The new whisky, thus treated, acquires, in the process of first manufacture, the color of old whisky and also the flavor of old whisky. Moreover, the fusel oil and other destructive ingredients of new whisky are substantially removed by the process.

The steps of the herein described method and the constructions involved in the apparatus may be varied within the terms of the following claim:

The method for continuously aging and coloring whisky during the distillation process, which consists in taking hot whisky vapors directly from a still and immediately passing the vapors through a body of wood shavings having a temperature lower than that of the vapors whereby to effect condensation of a percentage of the hot vapors on the wood shavings to extract the alcohol soluble wood extracts along with the tannin and whereby the subsequently flowing hot vapors vaporize and displace the prior condensate with the extracted solubles and tannin, collecting the remaining vapors and the condensate from the wood shavings, simultaneously condensing the remaining vapors and cooling the prior condensate containing the alcohol solubles, and collecting all of the condensate.

SAMUEL C. MILLER.